(12) United States Patent
Okuda et al.

(10) Patent No.: US 6,413,596 B1
(45) Date of Patent: Jul. 2, 2002

(54) HEAT-SHRINKABLE FILM AND CONTAINER HAVING THE SAME ATTACHED THROUGH HEAT SHRINKAGE

(75) Inventors: Tomohisa Okuda; Yuji Hanaoka, both of Moriyama (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 09/672,618

(22) PCT Filed: Feb. 3, 2000

(86) PCT No.: PCT/JP00/00598

§ 371 (c)(1),
(2), (4) Date: Sep. 29, 2000

(87) PCT Pub. No.: WO00/47396

PCT Pub. Date: Aug. 17, 2000

(30) Foreign Application Priority Data

Feb. 9, 1999 (JP) .............................................. 11-31573

(51) Int. Cl.[7] .......................... B32B 1/08; B32B 27/30; B32B 27/32; B32B 27/36; B29C 61/06
(52) U.S. Cl. ..................... 428/34.7; 428/34.6; 428/36.8; 428/36.9; 428/36.91; 428/36.92; 428/480; 428/519; 428/521; 428/910
(58) Field of Search ............................... 428/35.7, 36.8, 428/36.9, 34.6, 34.7, 34.9, 480, 519, 521, 910, 36.91, 36.92

(56) References Cited

U.S. PATENT DOCUMENTS

| | | | |
|---|---|---|---|
| 4,963,418 A | 10/1990 | Isaka et al. | 428/34.9 |
| 6,270,866 B1 * | 8/2001 | Okuda et al. | 428/35.1 |

FOREIGN PATENT DOCUMENTS

| | | | |
|---|---|---|---|
| EP | 1 024 162 A2 | | 8/2000 |
| JP | 57025349 A | | 2/1982 |
| JP | 59-97175 | | 6/1984 |
| JP | 61-5919 | * | 1/1986 |
| JP | 62-286726 | | 12/1987 |
| JP | 88-49702 | | 10/1988 |
| JP | 4-41902 | | 7/1992 |
| JP | 7-165945 | | 6/1995 |
| JP | 7-188400 | | 7/1995 |
| JP | 9-239833 | | 9/1997 |
| JP | 9272182 A | | 10/1997 |
| JP | 9-272182 | | 10/1997 |

* cited by examiner

*Primary Examiner*—D. S. Nakarani
(74) *Attorney, Agent, or Firm*—Knobbe, Martens, Olson & Bear, LLP

(57) ABSTRACT

The present invention provides a heat shrinkable film comprising at least one layer of a thermoplastic resin and having a heat shrinkage in the main orientation direction of 10% or less after treatment in a hot water at 70° C. for 2 seconds, and 65% or more after treatment in hot water at 90° C. for 10 seconds, the heat shrinkable film preferably having a natural shrinkage in the main orientation direction of 2.5% or less after being allowed to stand at 40° C. for 7 days.

7 Claims, 1 Drawing Sheet

HEAT-SHRINKABLE FILM AND CONTAINER HAVING THE SAME ATTACHED THROUGH HEAT SHRINKAGE

This application is the U.S. National Phase under 35 U.S.C. §371 of International Application PCT/JP00/00598, filed Feb. 3, 2000, which claims priority to Japanese Patent Application No. 1999-31573, filed Feb. 9, 1999. The International Application was not published under PCT Article 21(2) in English.

TECHNICAL FIELD

The present invention relates to heat shrinkable films whose heat shrinkage in the main orientation direction is small in a low temperature range but large in a high temperature range, in particular the heat shrinkable films useful as labels.

BACKGROUND ART

It is a common practice to apply heat shrinkable films (labels) bearing printing on the internal surface to containers such as plastic containers, for exhibiting product names, instructions for use and other information, or for decorative purposes. Basic properties required of such films include transparency, gloss and firmness. Studies have been made on films comprising polystyrene resins or polyester resins to find a material satisfying the requirements (for example, Japanese Unexamined Patent Publications Nos. 272182/1997, 25349/1982 and 122152/1994).

Japanese Unexamined Patent Publication No. 272182/1997 discloses a heat shrinkable multi-layer film comprising inner and outer layers of a copolymer resin containing 2 to 50 wt. % of a polystyrene and 98 to 50 wt. % of a styrene-butadiene block copolymer with a styrene content of 65 to 90 wt. % and a butadiene content of 10 to 35 wt. %, and an intermediate layer of a polystyrene resin. The disclosed film has heat shrinking properties not possessed by a single-layer film, and is good in natural shrinking properties and firmness.

Japanese Unexamined Patent Publication No. 25349/1982 discloses a heat shrinkable film made of a mixture of 2 to 40 parts by weight of a polystyrene and 100 parts by weight of a styrene-butadiene block copolymer of the formula (S-B)n-S (wherein S is a styrene block, B is a butadiene block and n is an integer of 2 or more) with a styrene content of 70 to 93 wt. % and a butadiene content of 30 to 7 wt. %. The film, when used in combination with a styrene container, is advantageous from the viewpoint of recycling.

Japanese Unexamined Patent Publication No. 122152/1994 discloses a label made of a mixture of at least two polymers selected from the group consisting of polyethylene terephthalates synthesized from terephthalic acid or its derivative and a glycol component, copolyesters synthesized from terephthalic acid or its derivative and ethylene glycol having 1,4-cyclohexane dimethanol introduced therein, and copolymers synthesized from terephthalic acid or its derivative, isophthalic acid or its derivative and a glycol component. The heat shrinkage-temperature curve of the label has a sharp rise between 60° C. and 95° C.

However, the films disclosed in Japanese Unexamined Patent Publications Nos. 272182/1997 and 122152/1994 have a small heat shrinkage in a high temperature range, and thus have the problem that when they are applied by heat shrinking to a bottle having a neck diameter much smaller than the body diameter (i.e., a bottle with a high degree of taper) to wrap the bottle from the body portion to the neck portion or to the cap top surface, the films do not sufficiently shrink at the neck portion or the cap top surface, failing to achieve good finished conditions.

An object of the present invention is to provide a heat shrinkable film suitable for applying by heat shrinking to a bottle having a neck diameter much smaller than the body diameter to wrap the bottle from the body portion to the neck portion, from the body portion to the cap top surface, from the bottom portion to the neck portion, or from the bottom portion to the cap top surface, the heat shrinkable film preferably having a small natural shrinkage in the main orientation direction.

DISCLOSURE OF THE INVENTION

Figure 1:
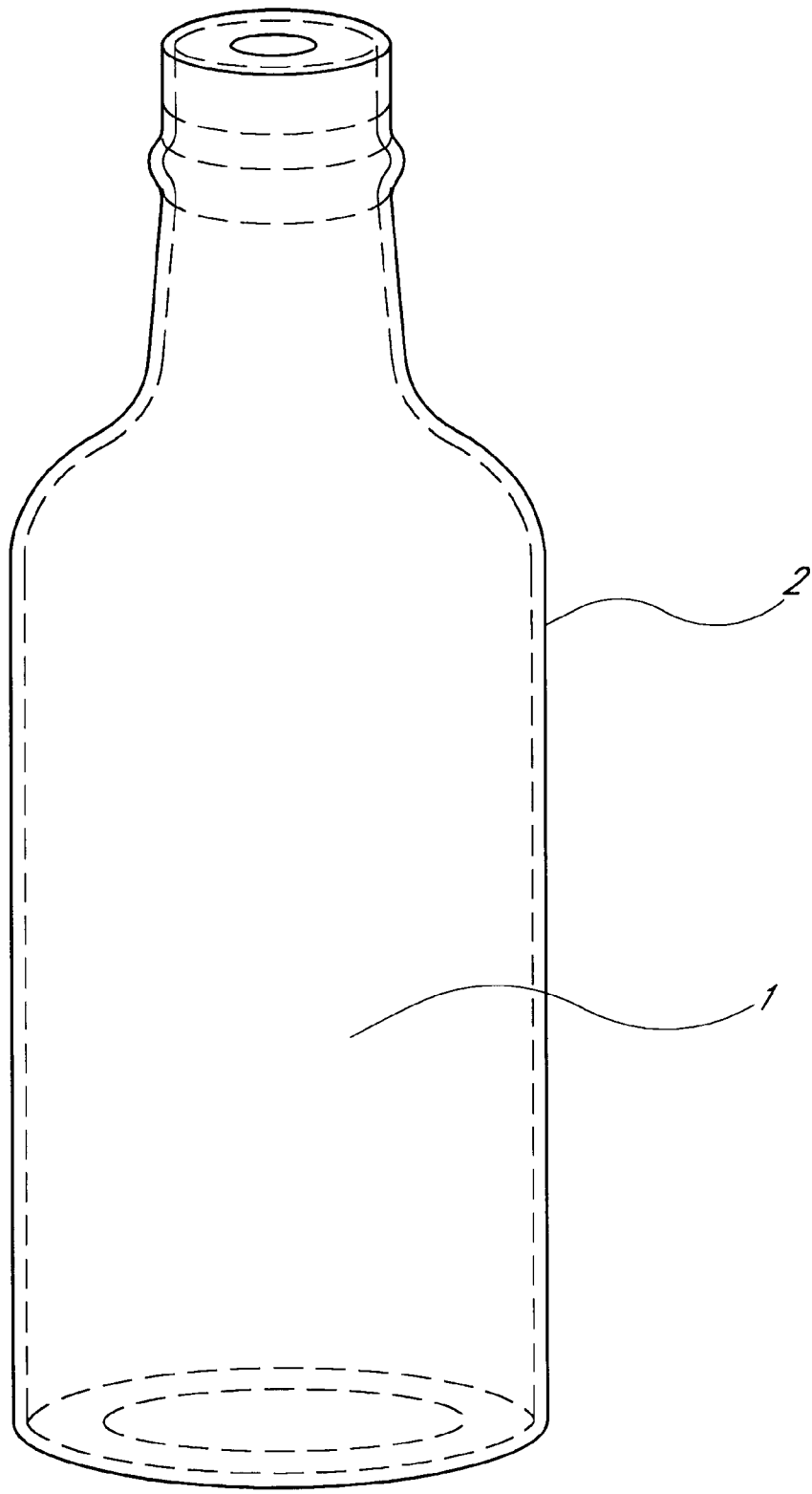
FIG. 1 is a perspective view of a glass bottle 1 to which the heat shrinkable film (label) 2 obtained in Example 2, 3 or 4 has been applied by heat shrinking.

The present invention provides the following Items 1 to 7:

1. A heat shrinkable film comprising at least one layer of a thermoplastic resin and having a heat shrinkage in the main orientation direction of 10% or less after treatment in hot water at 70° C. for 2 seconds, and 65% or more after treatment in hot water at 90° C. for 10 seconds.

2. A heat shrinkable film according to Item 1 which has a natural shrinkage in the main orientation of 2.5% or less after being allowed to stand at 40° C. for 7 days.

3. A heat shrinkable film according to Item 1 wherein the thermoplastic resin comprises a polyester resin or a polystyrene resin.

4. A heat shrinkable film according to Item 1 comprising at least three layers (A)/(B)/(C) laminated in this order, the layer (B) being an intermediate layer comprising at least one resin selected from the group consisting of polystyrenes, high impact polystyrenes and graft type high impact polystyrenes, and the layers (A) and (C) being inner and outer layers comprising a styrene-conjugated diene block copolymer.

5. A heat shrinkable film according to Item 4 wherein the intermediate layer (B) further contains a styrene-conjugated diene block copolymer and/or a styrene-conjugated diene block elastomer.

6. A heat shrinkable film according to Item 4 wherein the inner and outer layers (A) and (C) further contain at least one resin selected from the group consisting of polystyrenes, high impact polystyrenes and graft type high impact polystyrenes.

7. A container having a heat shrinkable film according to any one of Items 1 to 6 applied by heat shrinking.

The present invention will be described below in detail.

The heat shrinkable film of the invention has a heat shrinkage in the main orientation direction of 10% or less, preferably 8% or less, particularly preferably 5% or less, after treatment in hot water at 70° C. for 2 seconds, and a heat shrinkage in the main orientation direction of 65% or more, preferably 70% or more, particularly preferably 75% or more, after treatment in hot water at 90° C. for 10 seconds.

The term "main orientation directions" as used herein means the machine or transverse direction whichever is greater in stretch ratio. For example, when the film is applied to a bottle, the direction to become the circumferential direction of the bottle is the main orientation direction.

A film whose heat shrinkage in the main orientation direction exceeds 10% after treatment at 70° C. for 2 seconds has the following problems: When such a film (label) is to be applied to a bottle having a neck diameter much smaller than the body diameter (a bottle having a high degree of taper) to wrap the bottle from the body portion to the neck portion, from the body portion to the cap top surface, from the bottom portion to the neck portion, or from the bottom portion to the cap top surface, the film, as placed around the bottle and passed through a shrink tunnel, rapidly heat shrinks and slides up toward the neck portion or the top surface of the bottle in the vicinity of the shrink tunnel entrance, failing to affix the film to a desired position.

A film whose heat shrinkage in the main orientation direction is less than 65% after treatment at 90° C. for 10 seconds does not sufficiently shrink at the neck portion or the top surface of the bottle when passed through a shrink tunnel. Thus, such a film does not tightly fit to a bottle.

The film of the invention is capable of being affixed to a desired position and tightly fitting to the bottle at the neck portion and the top surface. It is presumed that the film, which has a small heat shrinkage after treatment at 70° C. for 2 seconds, undergoes substantially no shrinkage in the vicinity of the shrink tunnel entrance, and as moving forward through the tunnel and being gradually heated, the film is first loosely affixed to the bottle at the body portion and the bottom edge and thereby properly positioned. Then, as further advancing through the tunnel and being further heated, the film sufficiently shrinks at the neck portion and the top surface of the bottle since the film has a large heat shrinkage after treatment at 90° C. for 10 seconds, so that the film tightly fits to the bottle.

It is desirable that the film of the invention has a natural shrinkage in the main orientation direction of 2.5% or less, preferably 2.0% or less, after being allowed to stand at 40° C. for 7 days. If the natural shrinkage of the film exceeds 2.5%, sleeve-shaped labels prepared from the film spontaneously shrink during long-term storage, and become small in diameter and difficult to apply to bottles.

The film of the invention can be prepared by, for example, as follows: A resin is melted in an extruder and extruded from a T-die, taken off with take-off rolls, stretched with rolls in the machine direction, stretched with a tenter in the transverse direction, annealed, cooled and wound up with a wind-up roll. It is preferred that the film of the invention is substantially a uniaxially orientated film obtained by, for example, stretching the film 3 to 10 times the initial dimension in the main orientation direction and 1 to 2 times the initial dimension in the direction perpendicular to the main orientation direction. The reason for employing such a stretch ratio is that a film obtained at an ordinary stretch ratio for biaxial orientation has a large heat shrinkage in the direction perpendicular to the main orientation direction, with the result that the film applied to a bottle undergoes longitudinal shrinkage (shrinkage in the direction of the bottle height), hence undesirable. Accordingly, the heat shrinkage in the direction perpendicular to the main direction is 20% or less, preferably 15% or less, after treatment in hot water at 90° C. for 10 seconds. The thickness of the heat shrinkable film is usually 10 to 150 μm, preferably 20 to 70 μm.

The heat shrinkage after treatment at 70° C. for 2 seconds or at 90° C. for 10 seconds, and the natural shrinkage at 40° C. can be adjusted by suitably selecting the resin ingredients, film thickness, extrusion temperature, draw ratio, take-off temperature, preliminary heating conditions, stretch ratio, stretch rate, stretch temperature, annealing conditions and cooling conditions for film production.

The containers used in the present invention are not limited and include various plastic bottles, glass bottles, molded containers and other containers to which the heat shrinkable film of the invention is applicable.

To make full advantage of the properties of the heat shrinkable film of the invention, it is preferred to use a bottle, in particular a bottle wherein the ratio of the circumferential length of the neck portion to the circumferencial length of the body portion is up to 0.6 times, preferably up to 0.5 times.

The resins used for forming the heat shrinkable film of the invention are not limited and include, for example, polyolefin resins, polyamide resins, cyclic olefin resins, polyvinyl chloride resins, thermoplastic polyester resins and polystyrene resins. When the film is used as labels, thermoplastic polyester resins and polystyrene resins are preferably used as the main ingredients, from the viewpoints of transparency, degree of firmness, gloss, and ease of thermal disposal.

Preferred thermoplastic polyester resins include those comprising, as the main ingredient, a resin commonly known as a copolymer polyester resin. The acid component of the copolymer polyester resin may be any of known acid components such as terephthalic acid; isophthalic acid; phthalic acid; 2,6-naphthalenedicarboxylic acid and like naphthalenedicarboxylic acids; 4,4'-dicarboxylic acid diphenyl and like dicarboxy biphenyls; 5-t-butylisophthalic acid and like substituted phthalic acids; 2,2,6,6-tetramethylbiphenyl-4,4'-dicarboxylic acid and like substituted dicarboxyl biphenyls; 1,1,3-trimethyl-3-phenylindene-4,5-dicarboxylic acid and its substitution products, 1,2-diphenoxyethane-4,4'-dicarboxylic acid and its substitution products and like aromatic dicarboxylic acids: oxalic acid, malonic acid, succinic acid, glutaric acid, adipic acid, azelaic acid, pimelic acid, undecanedicarboxylic acid, dodecanedicarboxylic acid, brasylic acid, tetradecanedicarboxylic acid, nonadecanedicarboxylic acid, docolindicarboxylic acid and like aliphatic dicarboxylic acids and their substitution products; and 4,4'-dicarboxycyclohexane and like alicyclic dicarboxylic acids and their substitution products. The diol component may be any of known diol components such as ethylene glycol, triethylene glycol, propylene glycol, butanediol, 1,6-hexanediol, 1,10-decanediol, neopentyl glycol, 2-methyl-2-ethyl-1,3-propanediol, 2-diethyl-1,3-propanediol, 2-ethyl-2-n-butyl-1,3-propanediol and like aliphatic diols; 1,3-cyclohexanedimethanol, 1,4-cyclohexanedimethanol and like alicyclic diols; ethylene oxide adducts of bisphenol compounds such as 2,2-bis(4'-β-hydroxyethoxydiphenyl)propane and bis(4'-β-hydroxyethoxyphenyl)sulfone: xylylene glycol and like aromatic diols; and diethylene glycol.

The copolymer polyester resins may be used singly or in combination. Further, a small amount of polyethylene terephthalate resin, polybutylene terephthalate resin or the like may be added.

The resin ingredients, film thickness, extrusion temperature, draw ratio, take-off temperature, preliminary heating conditions, stretch ratio, stretch rate, stretch temperature, annealing conditions and cooling conditions are suitably selected to obtain a film having a heat shrinkage in the main orientation direction of 10% or less after treatment at 70° C. for 2 seconds, and 65% or more after treatment at 90° C. for 10 seconds, and more preferably having a natural shrinkage in the main orientation direction of 2.5% or less. Preferred examples of these conditions are shown in Example 1 given hereinafter.

Polystyrene resins include all the resins comprising styrene as a component, such as polystyrenes, high impact polystyrenes, graft type high impact polystyrenes and styrene-conjugated diene block copolymers.

Polystyrenes include homopolymers and copolymers of styrene, a-methylstyrene, p-methylstyrene and like styrene derivatives, and copolymers of styrene or its derivative with monomers copolymerizable therewith, such as acrylic acid, methacylic acid, their metal salts (e.g., Na, K, Li, Mg, Ca, Zn and Fe), acrylic ester, methacrylic ester and like aliphatic unsaturated carboxylic acids and their derivatives.

High impact polystyrenes include mixtures of a polystyrene and a synthetic rubber such as polybutadiene or polyisoprene, and graft polymers comprising a polystyrene grafted to a synthetic rubber such as polybutadiene or polyisoprene.

Graft type high impact polystyrenes are resins having a basic structure comprising a continuous phase of a polystyrene and rubber-like polymer particles dispersed therein, the polymer particles containing therein a polystyrene grafted to a rubber component such as polybutadiene.

Styrene-conjugated diene block copolymers are copolymers comprising styrene blocks and blocks of a conjugated diene such as butadiene or isoprene and having a styrene content of 55 to 95 wt. % and a conjugated diene content of 45 to 5 wt. %. Examples of such copolymers include S-J-S, J-S-J, (S-J)n-S and (J-S)n-J (wherein S is a styrene block, J is a conjugated diene block and n is an integer of 2 or more). Further, terpolymers and tetrapolymers comprising the styrene-conjugated diene block copolymer and other components) can be used in the present invention. Examples of the other components include acrylic acid, methacrylic acid and their metal salts (e.g., Na, K, Li, Mg, Ca, Zn and Fe), acrylic ester, methacylic ester and like aliphatic carboxylic acids and their derivatives.

Also usable are styrene-conjugated diene block copolymers wherein residual double bonds based on the conjugated diene are partially hydrogenated.

Styrene-conjugated diene block elastomers are elastomers comprising styrene blocks and blocks of a conjugated diene such as butadiene or isoprene, and having a styrene content of 5 to 50 wt. % and a conjugated diene content of 95 to 50 wt. %.

The film of the present invention may be a single-layer film comprising a polystyrene resin. The polystyrene resin m ay be any of those mentioned above, but is preferably a mixed resin system comprising 10 to 100 parts by weight, preferably 10 to 90 parts by weight, more preferably 20 to 60 parts by weight of a styrene-conjugated diene block copolymer and 100 parts by weight of at least one resin selected from the group consisting of polystyrenes, high impact polystyrenes and graft type high impact polystyrenes.

Also preferred is a mixed resin system comprising 2 to 50 parts by weight, preferably 5 to 30 parts by weight of a styrene-conjugated diene block elastomer, in place of or together with the styrene-conjugated diene block copolymer, and 100 parts by weight of at least one resin selected from the group consisting of polystyrenes, high impact polystyrenes and graft type high impact polystyrenes.

Use of such a mixed resin system enlarges the range of suitable production conditions, thereby facilitating the production of the heat shrinkable film of the invention.

The film of the invention may be a multi-layer film comprising a polystyrene resin. Examples of such films include a film consisting of three layers (A)/(B)/(C) laminated in this order, wherein the layer (B) is an intermediate layer comprising at least one resin selected from the group consisting of polystyrenes, high impact polystyrenes and graft type high impact polystyrenes, and the layers (A) and (C) are inner and outer layers comprising a styrene-conjugated diene block copolymer.

It is desirable that the thickness of the intermediate layer (B) accounts for 30 to 99%, preferably 50 to 97%, more preferably 60 to 95% of the total thickness of the film. Preferably, the inner and outer layers (A) and (C) are identical with each other in make-up and thickness in respect to curling.

It is preferred that the intermediate layer (B) further contains a styrene-conjugated diene block copolymer and/or a styrene-conjugated diene block elastomer. The amount of the styrene-conjugated diene block copolymer and/or styrene-conjugated diene block elastomer to be added is as defined above. Use of such a mixed resin system enlarges the range of suitable production conditions, thereby facilitating the production of the heat shrinkable film of the invention.

Further, it is preferred that the inner and outer layers (A) and (C) contain, in addition to the styrene-conjugated diene block copolymer, at least one resin selected from the group consisting of polystyrenes, high impact polystyrenes and graft type high impact polystyrenes. The at least one resin selected from the group consisting of polystyrenes, high impact polystyrenes and graft type high impact polystyrenes is added in an amount of preferably 5 to 100 parts by weight, more preferably 5 to 90 parts by weight, most preferably 15 to 40 parts by weight, per 100 parts by weight of the resin (styrene-conjugated diene block copolymer) in the inner and outer layers (A) and (C). Use of such a mixed resin system enlarges the range of suitable production conditions, thereby facilitating production of the heat shrinkable film of the invention.

The layers of the film can be laminated by any known methods such as dry lamination and extrusion lamination, among which co-extrusion lamination (followed by co-orientation) is simple and easy, hence preferable. For co-extrusion, a T-die may be used to obtain a flat film, or a ring die may be used to obtain a tubular film which is then cut open to give a flat film.

BEST MODE FOR CARRYING OUT THE INVENTION

Typical examples of the present invention are given below to illustrate the invention in further detail.

The heat shrinkage in the main orientation direction after treatment at 70° C. for 2 seconds or at 90° C. for 10 seconds was measured by the following method: Ten square samples, 100 mm×100 mm, were cut out from the heat shrinkable film. One of the samples was dipped in hot water bath at 70° C. or 90° C. for 2 seconds or 10 seconds, and then immediately cooled with cold water. Then measured was the length L (mm) in the machine or transverse direction (the main orientation direction, i.e., the direction to become the circumferential direction of a bottle when the film is applied to the bottle). Subsequently, the heat shrinkage was found by subtracting L from 100. The same procedure was repeated using the nine other samples to find the average heat shrinkage of the 10 samples. The obtained value was used as the heat shrinkage after treatment at 70° C. for 2 seconds or at 90° C. for 10 seconds.

The above procedure was followed to find the heat shrinkage after treatment at 90° C. for 10 seconds in the perpendicular direction to the main orientation direction.

The natural shrinkage of the film was determined by allowing the film to stand at 40° C. for 7 days and calculating the shrinkage in the main orientation direction.

The finished conditions of the shrunk label were observed at the body portion, bottom portion, neck portion and cap top surface of the bottle, and rated as "○" when the label was smooth and had no defects, and as "X" when the label had any defects.

EXAMPLE 1

Melted in an extruder was a mixture of 75 wt. % of a copolymer polyester A (IV 0.76) comprising terephthalic acid as an acid component and 70 mol % of ethylene glycol and 30 mol % of 1,4-cyclohexanedimethanol as diol components; 15 wt. % of a copolymer polyester B (IV 0.71) comprising 85 mol % of terephthalic acid and 15 mol % of isophthalic acid as acid components and 85 mol % of ethylene glycol and 15 mol % of diethylene glycol as diol components; and 10 wt. % of polybutyrene terephthaltate (IV 0.70). The molten mixture was extruded from a T-die at 270° C., quenched at both surfaces with take-off rolls at a draw ratio of 160% and a surface temperature of 30° C. stretched in the machine direction to a length of 1.05 times the original length using rolls at 80° C. at a stretch rate of 3500%/min, cooled to 60° C., reheated to 92° C., and stretched again 1.10 times the previous length using rolls at a stretch rate of 24000%/min. The resulting film was then preliminarily heated at 120° C. for 5 seconds, stretched in the transverse direction to a width of 2.0 times the original width using a tenter at a first zone temperature of 75° C. at a stretch rate of 8800%/min, heat-treated at 88° C. for 2 seconds, stretched again 2.2 times the previous width using a tenter at a second zone temperature of 82° C. at a stretch rate of 6900%/min, annealed in an atmosphere at 70° C. while permitting the film to relax by 2.5% in the transverse direction and 3.0% in the machine direction, and cooled with a cooling roll at 40° C., to thereby obtain a 40 μm thick heat shrinkable film. Table 1 shows the heat shrinkage and natural shrinkage of the obtained film.

EXAMPLE 2

Five-color photogravure was provided on one side of the heat shrinkable film obtained in Example 1, using a photogravure printing machine. Then, using an organic solvent, the film was made into a tube having a flattened tube width of 110 mm by center sealing so that the printed surface became the internal surface and the transverse direction of the film became the circumferential direction of the container. The resulting tubular film was cut in a length of 195 mm to obtain a label.

The label was placed around a glass bottle (container) with a height of 190 mm, a body diameter of 65.5 mm and a neck diameter of 30 mm, and passed through a wet heat shrink tunnel (length: 3.5 m, vapor pressure: 1.2 kg/cm ) for heat shrinking at 90° C. for 10 seconds. Table 2 shows the finished conditions of the shrunk label.

EXAMPLE 3

Melted in an extruder was a mixed resin system of 100 parts by weight of a polystyrene (manufactured by ASAHI CHEMICAL INDUSTRY CO., LTD., SC-008), 43 parts by weight of a styrene-butadiene block copolymer containing 20 wt. % of a styrene homopolymer (manufactured by DENKI KAGAKU K.K., CLEAREN 200ZH), and 14 parts by weight of a styrene-conjugated diene block elastomer (manufactured by ASAHI CHEMICAL INDUSTRY CO., LTD., TAFPLEN126). The molten resin system was extruded from a T-die at 180° C., taken off with take-off rolls at 52° C. at a draw ratio of 102%, stretched in the machine direction to a length of 1.8 times the original length using rolls at 110° C. at a stretch rate of 20000%/min. The resulting film was then preliminarily heated at 120° C. for 10 seconds, stretched in the transverse direction to a width of 6.8 times the original width using a tenter at a first zone temperature of 100° C. and a second zone temperature of 88° C. at a stretch rate of 1650%/min, annealed in the vicinity of the tenter exit at 78° C. over 3.5 seconds while permitting the film to relax by 0.5% in the transverse direction, and subjected to first cooling with air at 35° C. and then to second cooling with a cooling roll at 30° C., to thereby obtain a 60 μm thick heat shrinkable film. Table 1 shows the heat shrinkage and natural shrinkage of the obtained film.

The film was then heat shrunk in the same manner as in Example 2. Table 2 shows the finished conditions of the heat shrunk label.

EXAMPLE 4

Melted in two extruders was the same styrene-butadiene block copolymer as used in Example 3 for preparing inner and outer layers (A) and (C). Melted in another extruder was a mixed resin system for preparing an intermediate layer (B) consisted of 100 parts by weight of a graft type high impact polystyrene resin (manufactured by ASAHI CHEMICAL INDUSTRY CO., LTD., ASAHI CHEMICAL POLYSTYRENE SS-700) and 16 parts by weight of the same styrene-conjugated diene block elastomer as used in Example 3. The contents of the three extruders were laminated by fusing in a single T-die at 195° C. to form layers (A)/(B)/(C) superposed in this order, and extruded from the T-die. The extruded multi-layer film was taken off with take-off rolls at 40° C. at a draw ratio of 102%, stretched in the machine direction to a length of 1.5 times the original length using rolls at 90° C. at a stretch rate of 15000%/min. The resulting film was then preliminarily heated at 120° C. for 6 seconds, stretched in the transverse direction to a width of 6.8 times the original width using a tenter at a first zone temperature of 100° C. and a second zone temperature of 80° C. at a stretch rate of 3800%/min, annealed in the vicinity of the tenter exit at 70° C. over 5 seconds while permitting the film to relax by 1.2% in the transverse direction, and subjected to first cooling with air at 35° C. and then to second cooling with a cooling roll at 30° C., to thereby obtain a heat shrinkable film with a total thickness of 60 μm, wherein the inner and outer layers (A) and (B) were each 3 μm thick and the intermediate layer (B) was 54 μm thick. Table 1 shows the heat shrinkage and natural shrinkage of the obtained film.

The film was heat shrunk in the same manner as in Example 2. Table 2 shows the finished conditions of the heat shrunk label.

COMPARATIVE EXAMPLE 1

Melted in an extruder was a mixture of 55 wt. % of the same copolymer polyester A as used in Example 1, 30 wt. % of the copolymer polyester B as used in Example 1 and 15 wt. % of the same polybutylene terephthalate as used in Example 1. The molten mixture was extruded from a T-die at 270° C., quenched at both surfaces with take-off rolls at a surface temperature of 30° C., stretched in the machine direction to a length of 1.02 times the original length using rolls at 80° C. at a stretch rate of 3500%/min, cooled to 60° C., reheated to 92° C. and stretched again 1.05 times the previous length using rolls at a rate of 24000%/min. The resulting film was then preliminarily heated at 90° C. for 5 seconds, stretched in the transverse direction to a width of 4.4 times the original width using a tenter at 80° C. at a stretch rate of 6700%/min, annealed in an atmosphere at 70° C. while permitting the film to relax by 1.0% in the transverse direction and 2.0% in the machine direction, and cooled with a cooling roll at 30° C., to thereby obtain a 40 μm thick heat shrinkable film. Table 1 shows the heat shrinkage and natural shrinkage of the obtained film. Table 1 reveals that the film has a large heat shrinkage in the main orientation direction after treatment at 70° C. for 2 seconds.

Then, the film was heat shrunk in the same manner as in Example 2. The film slid up and was not affixed to the desired position. This is because the film had too large a heat shrinkage in the main orientation direction after treatment at 70° C. for 2 seconds.

COMPARATIVE EXAMPLE 2

Melted in two extruders was the same styrene-butadiene block copolymer as used in Example 3 for preparing inner and outer layers (A) and (C). Melted in another extruder was a mixed resin system for preparing an intermediate layer (B) consisted of 100 parts by weight of the same graft type high impact polystyrene resin as used in Example 4 and 8 parts by weight of the same styrene-conjugated diene block elastomer as used in Example 3. The contents of the three extruders were laminated by fusing in a single T-die to form layers (A)/(B)/(C) superposed in this order, and extruded from the T-die. The extruded multi-layer film was taken off with take-off rolls at 40° C. at a draw ratio of 102%, stretched in the machine direction to a length of 1.5 times the original length using rolls at 90° C. at a stretch rate of 10500%/min. The resulting film was then preliminarily heated at 120° C. for 6 seconds, and stretched in the transverse direction to a width of 5 times the original width using a tenter at a first zone temperature of 100° C. and a second zone temperature of 90° C. at a stretch rate of 2100%/min, annealed in the vicinity of the tenter exit at 80° C. over 7 seconds while permitting the film to relax by 1.2% in the transverse direction, and subjected to first cooling with air at 35° C. and then to second cooling with a cooling roll at 30° C., to thereby obtain a heat shrinkable film having a total thickness of 60 μm, wherein the inner and outer layers (A) and (C) were each 7.5 μm thick and the intermediate layer (B) was 45 μm thick. Table 1 shows the heat shrinkage and natural shrinkage of the obtained film. Table 1 reveals that the film had a small heat shrinkage in the main orientation direction after treatment at 90° C. for 10 seconds.

The film was then heat shrunk in the same manner as in Example 2. Table 2 shows the finished conditions of the heat shrunk label. In Table 2, the conditions of the neck portion and the top surface are rated as "X" since the film did not shrink sufficiently on these parts. The insufficient shrinkage is the result of the small heat shrinkage in the main orientation direction after treatment at 90° C. for 10 seconds.

TABLE 1

| Heat shrinkage (%) | Ex. 1 | Ex. 3 | Ex. 4 | Comp. Ex. 1 | Comp. Ex. 2 |
| --- | --- | --- | --- | --- | --- |
| Main orientation dir. | | | | | |
| 70° C. | 5 | 4 | 3 | 20 | 1 |
| 90° C. | 75 | 77 | 76 | 74 | 58 |
| Perpendicular dir. 90° C. | −1 | 15 | 12 | 2 | −1 |
| Natural shrinkage (%) | 0.4 | 1.5 | 2.0 | 0.5 | 1.1 |

TABLE 2

| Finished conditions of heat shrunk label | Ex. 2 | Ex. 3 | Ex. 4 | Comp. Ex. 2 |
| --- | --- | --- | --- | --- |
| Body portion | ○ | ○ | ○ | ○ |
| Bottom portion | ○ | ○ | ○ | ○ |
| Neck portion | ○ | ○ | ○ | X |
| Top surface | ○ | ○ | ○ | X |

The label prepared from the film of the invention can be affixed to a desired position without causing wrinkles, pockmarks, insufficient shrinkage or other defects at the body portion, the bottom portion, the neck portion or the top surface, when the label is applied by heat shrinking to a bottle having a neck diameter much smaller than the body diameter to wrap the bottle from the body portion to the neck portion, from the body portion to the cap top surface, from the bottom portion to the neck portion, or from the bottom portion to the top surface. Thus, an article having heat shrunk label with good appearance can be obtained by using the film of the present invention.

Further, the label prepared from the film of the invention is free from the problem that the label comes to have a reduced diameter owing to natural shrinkage and becomes difficult to apply to a container.

What is claimed is:

1. A heat shrinkable film comprising at least one layer of a thermoplastic resin and having a heat shrinkage in the main orientation direction of 10% or less after treatment in hot water at 70° C. for 2 seconds, and 65% or more after treatment in hot water at 90° C. for 10 seconds.

2. A heat shrinkable film according to claim 1 which has a natural shrinkage in the main orientation direction of 2.5% or less after being allowed to stand at 40° C. for 7 days.

3. A heat shrinkable film according to claim 1 wherein the thermoplastic resin comprises a polyester resin or a polystyrene resin.

4. A heat shrinkable film according to claim 1 comprising at least three layers (A)/(B)/(C) laminated in this order, the layer (B) being an intermediate layer comprising at least one resin selected from the group consisting of polystyrenes, high impact polystyrenes, and high impact graft polystyrenes, and the layers (A) and (C) being inner and outer layers comprising a styrene-conjugated diene block copolymer.

5. A heat shrinkable film according to claim 4 wherein the intermediate layer (B) further contains a styrene-conjugated diene block copolymer and/or a styrene-conjugated diene block elastomer.

6. A heat shrinkable film according to claim 4 wherein the inner and outer layers (A) and (C) further contain at least one resin selected from the group consisting of polystyrenes, high impact polystyrenes, and high impact graft polystyrenes.

7. A container having a heat shrinkable film according to any one of claims 1 to 6 applied by heat shrinking.

* * * * *